United States Patent
Liao et al.

(10) Patent No.: US 10,321,409 B2
(45) Date of Patent: Jun. 11, 2019

(54) SYSTEM AND METHOD FOR JOINT POWER ALLOCATION AND ROUTING FOR SOFTWARE DEFINED NETWORKS

(71) Applicant: Huawei Technologies Co., Ltd., Shenzhen (CN)

(72) Inventors: Wei-Cheng Liao, Minneapolis, MN (US); Mingyi Hong, Minneapolis, MN (US); Zhi-Quan Luo, Maple Grove, MN (US); Hamidreza Farmanbar, Ottawa (CA); Xu Li, Nepean (CA); Hang Zhang, Nepean (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 216 days.

(21) Appl. No.: 14/524,888

(22) Filed: Oct. 27, 2014

(65) Prior Publication Data
US 2015/0119050 A1 Apr. 30, 2015

Related U.S. Application Data

(60) Provisional application No. 61/896,365, filed on Oct. 28, 2013.

(51) Int. Cl.
*H04W 40/08* (2009.01)
*H04W 40/10* (2009.01)
(Continued)

(52) U.S. Cl.
CPC ............ *H04W 52/04* (2013.01); *H04W 40/08* (2013.01); *H04W 40/10* (2013.01);
(Continued)

(58) Field of Classification Search
USPC .......................................... 709/220
See application file for complete search history.

(56) References Cited

U.S. PATENT DOCUMENTS

| 2004/0032835 | A1* | 2/2004 | Majidi-Ahy | ......... H04L 1/0003 370/252 |
|---|---|---|---|---|
| 2010/0103867 | A1 | 4/2010 | Kishiyama et al. | |

(Continued)

OTHER PUBLICATIONS

Erwin Wei and Asuman Ozdaglar, Distributed Alternating Direction of Multipliers, Dec. 10-13, 2012 51st IEEE Conference on Decision and control.*

(Continued)

*Primary Examiner* — Hermon Asres
(74) *Attorney, Agent, or Firm* — Slater Matsil, LLP

(57) ABSTRACT

An embodiment of a method for network resource management comprises performing joint traffic engineering and physical layer power control on a controller and using a routing and power control optimization process that comprises a combined alternating direction method of multipliers (ADMM) process and a power management process. First and second commands are generated at the controller according to optimization parameters determined by the routing and power control optimization process. The first and second commands are transmitted from the controller to nodes connected to the controller. The first commands are for modifying transmission parameters for links between nodes and the second commands are for modifying transmission parameters for connections between nodes and user devices.

17 Claims, 5 Drawing Sheets

(51) Int. Cl.
*H04W 52/04* (2009.01)
*H04W 52/26* (2009.01)

(52) U.S. Cl.
CPC ........... *H04W 52/265* (2013.01); *Y02D 70/00* (2018.01); *Y02D 70/324* (2018.01); *Y02D 70/326* (2018.01)

(56) References Cited

U.S. PATENT DOCUMENTS

| | | | |
|---|---|---|---|
| 2010/0142421 A1* | 6/2010 | Schlicht | H04W 4/20 370/310 |
| 2012/0005371 A1 | 1/2012 | Ravindran et al. | |
| 2013/0018517 A1 | 1/2013 | Kalagnanam et al. | |
| 2013/0151525 A1 | 6/2013 | Ankan et al. | |
| 2013/0237268 A1* | 9/2013 | Teng | H04L 5/0032 455/509 |
| 2013/0304266 A1* | 11/2013 | Giannakis | G01R 21/133 700/286 |
| 2014/0169788 A1* | 6/2014 | Hussain | H04L 12/00 398/43 |

OTHER PUBLICATIONS

Erwin Wel and Asuman Ozdaglar, Distributed Alternating Direction of Multipliers, Dec. 10-13, 2012 51st IEEE Conference on Decision and control.*

Markus Leinonen, Marian Codreanu, and Markku Juntti, Consensus based distributed joint power and routing optimization in wireless sensor networks. Dec. 2012.*

International Search Report and Written Opinion of the International Searching Authority received in Patent Cooperation Treaty Application No. PCT/US14/62456, dated Feb. 9, 2015, 9 pages.

* cited by examiner

SYSTEM AND METHOD FOR JOINT POWER ALLOCATION AND ROUTING FOR SOFTWARE DEFINED NETWORKS

CROSS REFERENCE TO RELATED APPLICATIONS

This application claims the benefit of the following provisionally filed U.S. patent application: Application Ser. No. 61/896,365, filed Oct. 28, 2013, and entitled "System and Method for Joint Power Allocation and Routing for Software Defined Networks," which application is hereby incorporated herein by reference.

TECHNICAL FIELD

The present invention relates to a system and method for networking, and, in particular embodiments, to system and method for joint power allocation and routing for software defined networks.

BACKGROUND

A cellular radio system provides communications coverage over a selected area by a radio service and is divided into cells serviced by one or more antennas for corresponding radio base stations. Communications, for example, for data or voice transmissions, are generally provided over a wired backhaul network that is serviced by one or more network routers. The network routers are used to route the communications between origination points such as user handsets, other networks, service providers, or the like and the base stations, where the base stations transmit the communications wirelessly to end user devices.

SUMMARY

An embodiment of a method for network resource management includes performing optimal flow routing using an alternating direction method of multipliers (ADMM) algorithm.

An embodiment of a method for network resource management includes performing joint traffic engineering and physical layer power control using a combined ADMM algorithm and a power management process such as a weighted minimum mean square error (WMMSE) algorithm.

An embodiment of a communications system node includes a processor and a nontransitory computer readable medium coupled to the processor. The nontransitory computer readable medium has stored thereon instructions for performing a portion of a routing and power control optimization process that comprises a combined alternating direction method of multipliers (ADMM) process, wherein the ADMM process is used to dynamically generate optimized parameters for transmissions of communication over one or more links between the communications systems node and second communications systems nodes and transmitting the transmissions according to the optimized parameters.

An embodiment of a communications system controller includes a processor and a nontransitory computer readable medium coupled to the processor. The nontransitory computer readable medium has stored thereon instructions for communicating with nodes on a communication network and performing joint traffic engineering and physical layer power control by performing a portion of a routing and power control optimization process that comprises a combined alternating direction method of multipliers (ADMM) process and a power management process. The routing and power control optimization process generates optimized parameters determining communications by each of the nodes.

An embodiment of a method for network resource management comprises performing joint traffic engineering and physical layer power control on a controller and using a routing and power control optimization process that comprises a combined alternating direction method of multipliers (ADMM) process and a power management process. First and second commands are generated at the controller according to optimization parameters determined by the routing and power control optimization process. The first and second commands are transmitted from the controller to nodes connected to the controller. The first commands are for modifying transmission parameters for links between nodes and the second commands are for modifying transmission parameters for connections between nodes and user devices.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
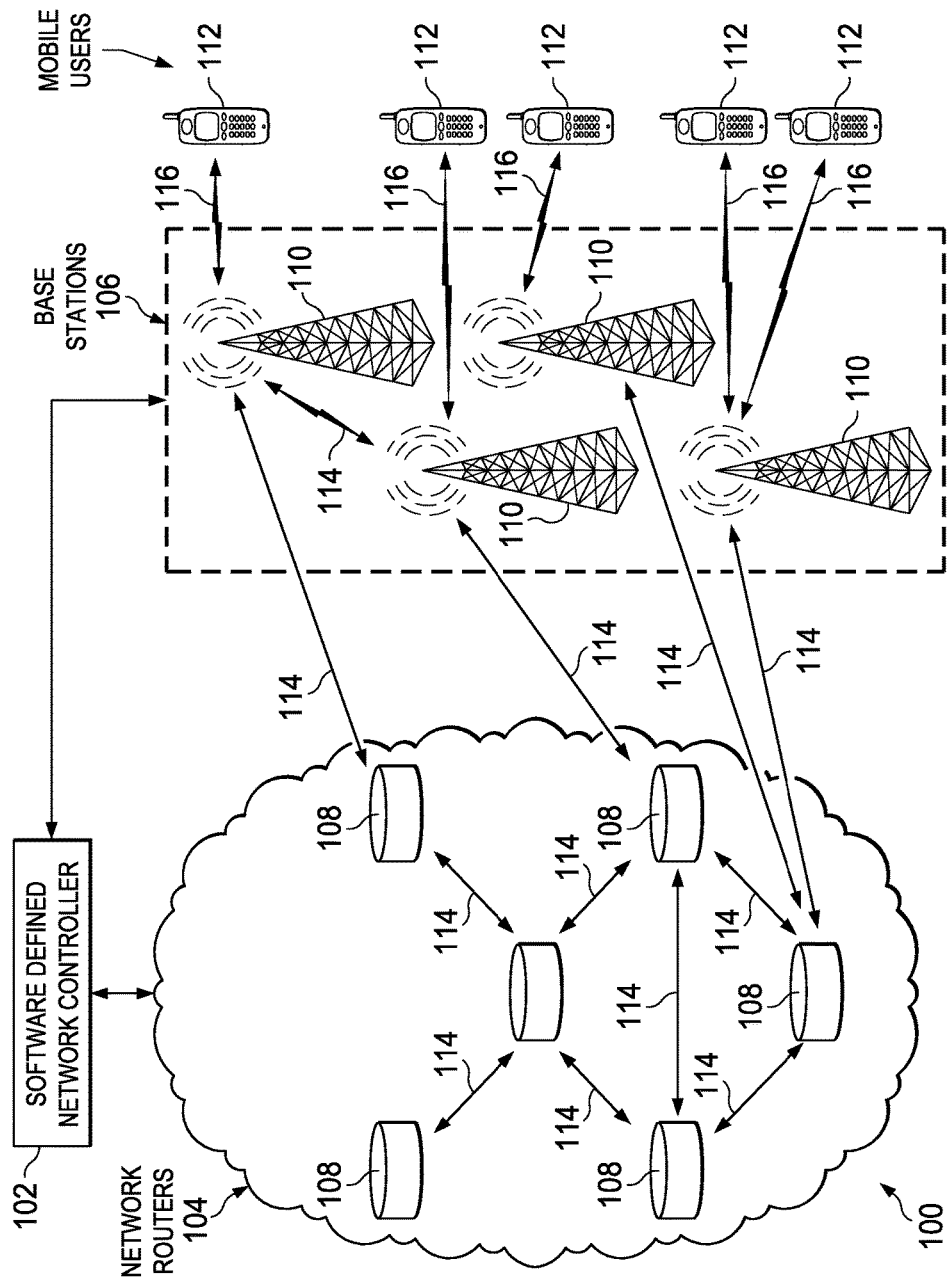
FIG. 1 illustrates a network system model.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

A network routing, flow control and power control solution can be provided by concurrently determining flow rates in a backhaul network and determining optimized power/frequency allocation based on the flow constraints. The overall system can be optimized by a process that uses power and rate variables that are dependent on each other. The optimization of the power/frequency allocation can be achieved through an iterative process in combination with different flow or networking allocations to determine the optimized combination of power/frequency and network routing. Thus, power/frequency allocation and network routing are determined simultaneously so that when one link in the transmission path is constrained, other network links in the transmission path are used to avoid idle resource capacity. In particular, the embodiments described herein, when appropriate, provide optimized power or frequency tone allocations for different wireless base station-to-user connections, and optimized flow rate parameters for backhaul link transmissions. This increases overall system performance by reducing the idle allocation resources. Additionally, the embodiments described herein permit parallel processing of the power/frequency/network allocations for different nodes, avoiding the inefficiencies inherent in interdependent and non-coordinated power and network allocation management systems.

With respect to power allocation design, one approach uses a N-Max-Min weighted minimum mean square error (WMMSE) algorithm. It relates the mean square error (MSE) values and rate of the interference channel and uses a block coordinate descent method. This approach can be extended to multi-antenna transceivers. An embodiment jointly manages the access link resource as well as performs network traffic engineering in the backhaul network. An embodiment provides the network with the capability to distributedly compute the desired optimal resource management and network traffic engineering (TE). An embodiment also enables fast centralized computation using cloud computation technology. An embodiment provides a parallel and distributed algorithm for joint flow routing and transmit power control in a wireless software defined network (SDN).

The network includes a cloud radio access subnetwork, and a capacity constrained backhaul subnetwork. An embodiment dynamically finds an optimal flow routing policy and transmit power allocation to achieve fairness among mobile users in the system. The WMMSE algorithm is, in an embodiment, used as an interference management system. In such an embodiment, flow routing or network management is integrated into the interference management provided by the WMMSE algorithm using, for example, an alternating direction method of multipliers (ADMM) method to manage flow control. The combination of the WMMSE interference and power management process with the ADMM flow control process results in a joint traffic engineering and physical layer power control process such as the N-MaxMin WMMSE process.

FIG. 1 illustrates a model of a network system 100 according to an embodiment. The network system 100 has N network routers 108 in a backhaul network 104, B base stations 110 in a radio access network 106, and U mobile user devices 112. Each user device 112 is a wireless terminal equipped with one or more antennas for sending and receiving communications over a wireless connection 116 from a base station 110. The routers 108 and base stations 110 are connected by capacity constrained links 114. Each base station 110 serves (possibly) multiple mobile user devices 112 with multiple tones/time slots or a combination thereof. Each user device 112 can be served by (possibly) multiple base stations 110. Users devices 112 share frequency/spatial resources, with each resource used by a subset of users. Multi-antenna linear/non-linear precoders or postcoders, such as beamforming, dirty paper coding or successive interference cancellation, may be used on top of the optimized routing and power control solution.

In some embodiments of the network system model 100, a controller 102 coordinates operation of the network 100. In an embodiment, a controller such as a software defined network controller 102 is in signal communication with the backhaul network 104 and the radio access network 106 to control routing, traffic flow, load balancing, wireless transmission parameters, transceiver association, and the like. In some embodiments, the software defined network controller 102 is one or more computing devices such as servers, processors, CPUs, or the like, that communicate with individual routers 108 and base stations 110. Additionally, the software defined network control 102 is, in some network layouts, located remotely from the routers 108 and base stations 110, permitting the software defined network controller 102 to be housed in facilities with significantly more power and computing availability than at a base station or local office location. For example, the software defined network controller 102 maybe a cloud-based system, with multiple processors disposed in one or more data center locations. In such an embodiment, the optimized routing and power control system has portions, such as the ADMM calculations, distributed across multiple processors, taking advantage of the parallel nature of ADMM processing. A centralized operator on the software defined network controller, such as a master node is used to update the variables in the optimized routing and power control system during router and power control operations. Additionally, the WMMSE interference and power control in combination with the ADMM network flow routing permits distributed implementation while taking interference channels into account and providing a rapid convergence solution during processing.

In some embodiments, the software defined network controller 102 communicates with the base stations 110 to determine the number of user devices 112 that have wireless connections 116 to the individual base stations 110, and in some instances, to determine the interference, power or other connection parameters for the wireless connection between each user device 112 and base station 110. The software defined network controller 102 may also communicate with the routers 108 of the backhaul network 104 to determine the parameters of links 114 through communications passing to each of the routers 108. For example, the software defined network controller may 102 receive information from each router 108 such as the quality or status of links 114 between the particular router and connected routers, information on the number of links 114 or capacity for additional links through the router 108, the allocated or available link bandwidth at the router 108, or the like.

The software defined network controller 102 executes the optimized routing and power control process using the information from the routers 108 and the base stations 110 to determine optimum routing and transmission parameters for communications transiting the links 114 and wireless connections 116. In some embodiments, the software defined network controller 102 receives information from the base stations 110 and routers 108, and performs the routing and power control optimization process calculations based on the received information. However, in other embodiments, the routing and power control optimization process calculations are at least partially performed on the base stations 110 and routers 108, and the results are communicated back to the software defined network controller 102. In such embodiments, a controller, such as the software defined network controller 102, or a central controller, control server or node designated as a controller may coordinate calculations distributed across nodes such as the routers and base stations 110 by, for example, storing shared calculation variable values.

After the software defined network controller 102 has the results of the routing and power control optimization process calculations, the software defined network controller 102 may send instructions or commands to the routers 108 to control the routing and flow of communications transmitting the backhaul network 104. Additionally, the software defined network controller 102 may repeat the routing and power control optimization process to continually optimize the transmissions over the network. Furthermore, the software defined network controller 102 sends commands to the routers 108 and base stations 110 that are based on the results obtained from the routing and power control optimization. The routers 108 and base stations 110 execute the instructions to route the communications through the backhaul network 104 to a designated base station 110, and from the base station 110 to the user device 112 over a wireless connection 116 provisioned with power, frequency and carrier tones according to the instructions from the software defined network controller 102.

For example, available power and frequency tones available at a base station 110 may constrain the optimal flow rates for one or more communications through a particular router 108 to lower than the maximum flow rate available at the router 108. In such an example, the software defined network controller 102 may assign the communication to another base station 110 or transceiver at a base station 110 with excess capacity, or reallocate excess capacity at the router 108 to another communication. Similarly, where the one or more links 114 in backhaul network 104 creates a bottleneck or constraint in the path for a communication, the software defined network controller 102 may determine that the power or frequency tone allocation at the base station 110 handling the communication is in excess of that needed to handle the communication. In such a scenario, the software defined network controller 102 may reduce the allocation of base station resources for the communication to free resources for other communications through the base station 110. In other scenarios, the software defined network controller 102 may issue new routing tables, load balancing parameters or other network control parameters to the base stations 110, the routers 108, to other software defined network controllers 102 or to other components. It should be understood that the foregoing examples and scenarios are exemplary and are not intended to be limiting.

An embodiment can be implemented in a parallel and distributed manner across the nodes of the considered network with fast closed-form updates. For a centralized multicore system, a parallelization procedure can be utilized to further improve the efficiency. For example, the parameters for each node in a network may be processes separately or in parallel over multiple cores, multiple processors, multiple servers or multiple locations. An embodiment may be implemented to provide radio access network resource management. An embodiment dynamically associates transceivers and allocates power/frequencies among different receivers. An embodiment algorithm finds the stationary solution of a large network with a max-min fairness utility by updating transmitters, receivers, and link flow rates iteratively. Only local channel knowledge at each node of the considered network is needed to execute the algorithm. Throughput can be significantly increased compared to the standard path loss-based approach for transceiver association with uniform power allocation.

An embodiment process includes (semi-) closed-form update rules by exploiting the ADMM process. Distributed and/or parallel computation may be implemented based on an embodiment algorithmic framework. Embodiments can be extended to other network optimizations and configurations, such as handle quality of service (QoS) requirements for specific users, such as other network-wide optimization criteria like throughput, and such as users/mobiles equipped with multiple antennas.

Figure 2:
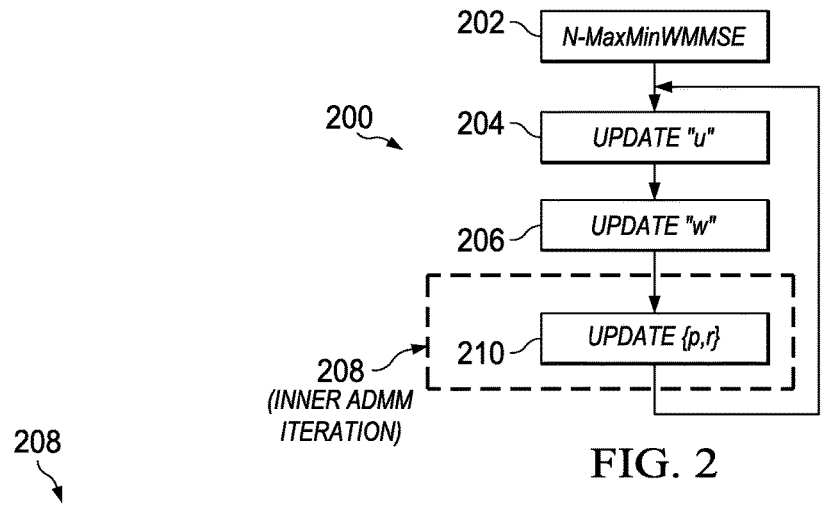
FIG. 2 illustrates a flow chart for an embodiment algorithm.

FIG. 2 illustrates a flow chart for an embodiment of the routing and power control optimization process 200. The network is described in terms suitable for use in the N-MaxMin WMMSE process. A feasible set of variable for power and flow rate are initially determined.

Let:

$$p_{ji}^k \qquad (1)$$

denote the transmit power of base station i for user j on frequency tone k, and $$r_l(j) \qquad (2)$$

denote the flow rate on link/for user j. Each node of the network satisfies the flow rate conservation constraint, i.e., for node v and user j, $$\Sigma_{l \in In(u)} r_l(j) = \Sigma_{l \in Out(u)} r_l(j) \qquad (3)$$

For the backhaul network, each link/has a capacity defined by $C_l$, i.e., $$\Sigma_j r_l(j) \le C_l. \qquad (4)$$

Let $$r_{ji}^k \qquad (5)$$

denote the rate of communication from transmitter i to receiver j via frequency tone k with power allocation p. Therefore, the rate of user j is given by:

$$R_j = \Sigma_{i,k} r_{ji}^k \qquad (6)$$

For fairness among users, min rate utility maximization design is adopted, but can be extended to other utilities including popular sum rate utility, proportional fairness utility and so on. A routing and power control optimization process is a combination of the ADMM process and a power management process. In an embodiment, the routing and power control optimization process is implemented by executing the N-MaxMin WMMSE algorithm in block 202. An embodiment of the N-MaxMin WMMSE algorithm has a basis model for the network of:

$$\max_{\{r_{ji}^k(p)\},\{p_{ji}^k\},\{r_l(j)\}} \min(R_1, \ldots, R_U) \qquad (7)$$

Equation 7, above, defines the objective utility function of the N-MaxMin WMMSE algorithm. The variables in Equation 7 are defined in terms of the transmit power $p_{ji}^k$, rate of communication and flow rate at the distinct power and frequency tones for the user or link $r_{ji}^k(p)$ and flow rates across wired links $r_l(j)$. A limit on the quality of service may be applied to inactivate links having data rates below a predetermined threshold. Thus, for links that have a capacity or flow rate below the predetermined threshold, flow rate Rj may be set to zero, and devices do not communicate to each other with these links. Hence, the transceiver association and the frequency tone selection can be dynamically determined. Such substitution simplifies and increases the speed of calculation by eliminating consideration of links that fail to meet the quality of service threshold.

A relationship between the flow rate and the MSE is defined. Assume:

$$E_{ji}^k(p,u_{ji}^k) \qquad (8)$$

is the MSE value of user j for data from base station i via frequency tone k while user j uses receive weight:

$$u_{ji}^k. \qquad (9)$$

Replace $$r_{ji}^k(p) \qquad (10)$$

by $$\tilde{r}_{ji}^k(p,u,w) \triangleq 1+\log(w_{ji}^k)-w_{ji}^k E_{ji}^k(p,u_{ji}^k) \qquad (11)$$

which describes the rate for a given link. Then the following two optimization problems are equivalent:

$$\max_{\{r_{ji}^k(p)\},\{p_{ji}^k\},\{t_I(j)\}} \min(R_1, \ldots, R_U) \qquad (12)$$

$$\max_{\{\tilde{r}_{ji}^k(p,u,w)\},\{p_{ji}^k\},\{t_I(j)\}} \min(R_1, \ldots, R_U) \qquad (13)$$

Variable u from Eqn. (13) represents the weight associated with each receiver and is updated locally in each receiver using closed form in block 204. Variable w is a weighting coefficient for the MSE from Eqn. (13) and is updated in closed form in block 206 at each receiver. The variable pair {p,r} is updated in block 210, and the updating in blocks 204, 206 and 210 are iteratively performed until the optimized flow rate and power distribution parameters for routers and base stations are determined within a predetermined threshold. Moreover, the objective value will gradually increase over iterations 204, 206, and 210. In an embodiment, the ADMM algorithm is applied in block 208 to update {p,r}, allowing for distributed and parallel implementation. In particular, local copies of {p,r} are introduced into network routers 108, base stations 110, and mobile user devices 112. Thus, each of the routers 108, base stations 110 and user devices 112 can iteratively perform local computation without too much information exchange between its neighbors. During iteration, the process tries to improve the total objective while gradually enforcing that the local variables should be equal to each other.

Figure 3:
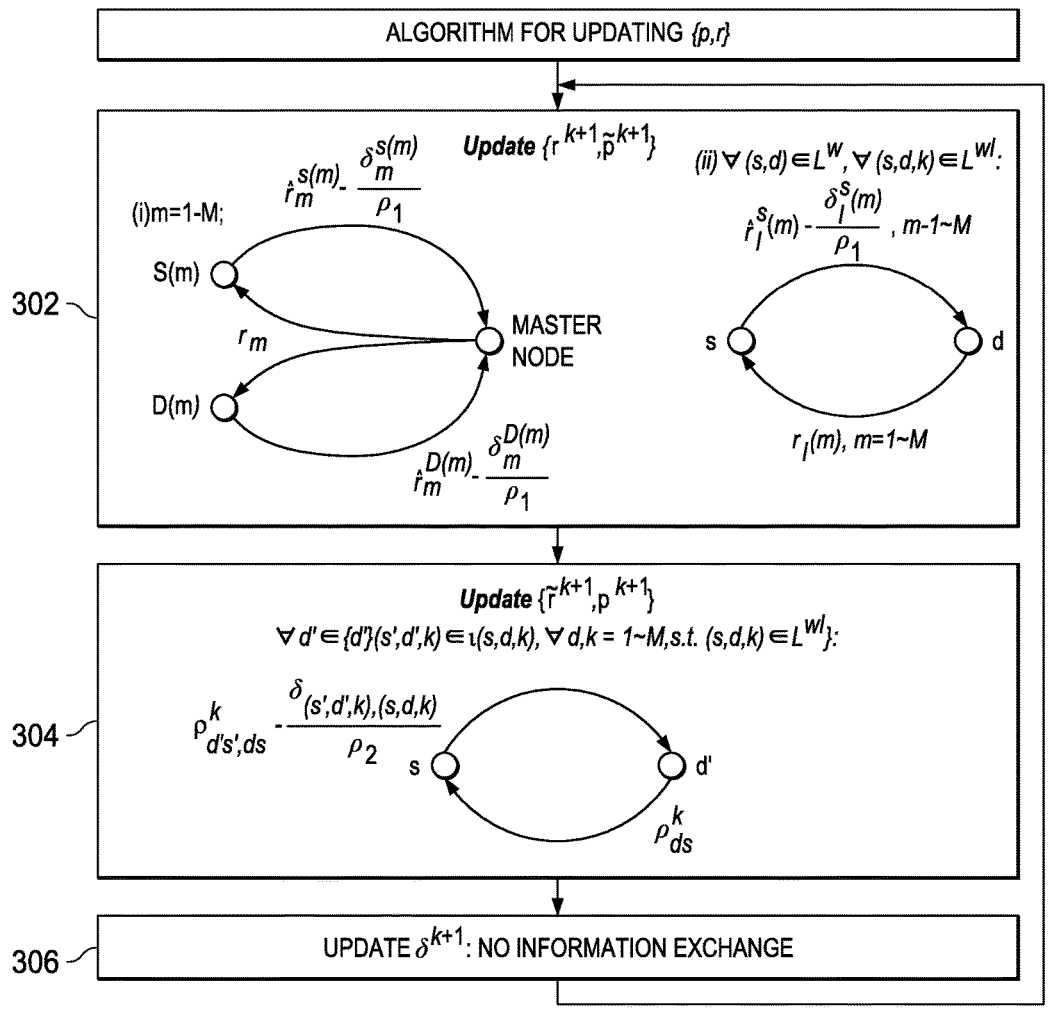
FIG. 3 illustrates a flow chart for updating {p,r}.

FIG. 3 is a flow chart illustrating an embodiment for applying the ADMM process 208 to update the {p,r} variables in the overall N-MaxMin WMMSE process.

Each node has the local copy of flow rate for connected links, such that:

$$\tilde{r}=r \qquad (14)$$

Each user has the local copy of interfering power allocation for connected links, such that:

$$\tilde{p}=p \qquad (15)$$

Denote the augmented Lagrange function of $$\max_{\{\tilde{r}_{ji}^k(p,u,w)\},\{p_{ji}^k\},\{t_I(j)\}} \min(R_1, \ldots, R_U) \qquad (16)$$

to be $L_\rho(r,\tilde{r},p,\tilde{p},\delta)$, with parameter $\rho$ and dual variable $\delta$.

Iteratively update each block variable with k being the iteration index:

$$\{r^{k+1}, \tilde{p}^{k+1}\} = \arg\max_{r,\tilde{p}} L_\rho(r, \tilde{r}^k, p^k, \tilde{p}, \delta^k) \qquad (17)$$

-continued $$\{\tilde{r}^{k+1}, p^{k+1}\} = \arg\max_{\tilde{r},p} L_\rho(r^{k+1}, \tilde{r}, p^{k+1}, \tilde{p}, \delta^k) \qquad (18)$$

$$\text{Update } \delta^{k+1} = f(\delta^k, r^{k+1}, \tilde{r}^{k+1}, p^{k+1}, \tilde{p}^{k+1}) \qquad (19)$$

The update steps (17) and (18) satisfy two properties: (i) closed-form, and (ii) parallel over each node. Thus, {$r^{k+1}$, $\tilde{p}^{k+1}$} is updated in block 302 and {$\tilde{r}^{k+1}$,$p^{k+1}$} is updated in block 304. Only information exchange between neighboring nodes is needed in blocks 302 and 304. Thus, the calculation may be distributed across multiple nodes with the controller coordinating communication of the updated variables and the nodes calculating portions of the N-MaxMin WMMSE process. In such embodiments, each of the nodes is configured to determine the values for parameters related to links that connect to the particular node and to iterate a portion of the ADMM process using updated variables for, {$r^{k+1}$,$\tilde{p}^{k+1}$} and {$\tilde{r}^{k+1}$,$p^{k+1}$}.

Specifically, S(m) and D(m) in block 302 are, respectively, the source and the destination device such as network routers or mobile user devices of the $m^{th}$ data information, and the master node coordinates the fairness between these data. The node s and d in block 302 are the two ending points for each link in the backhaul network. Similarly, s and d' are the corresponding ending points for each connection in the radio access network. In block 306, the dual variable {$\delta^{k+1}$} is updated, and the ADMM process for blocks 302, 304 and 306 is repeated until the solution converges. Here the convergence of the ADMM process is determined when the differences between {r,p} and their local copy {$\tilde{r}$,$\tilde{p}$} and the change of the objective value over iterations are within a predetermined threshold.

When the solution converges, the power and rate values at which the solution converges indicates local extrema and optimized power and rate transmission values for each link 114 or wireless connection 116. Thus, the routers 108 and base stations 110 can be controlled or commanded to execute the optimized routing and power management parameters to more efficiently use the network resources. Additionally, the transceiver association and the frequency tone selection can be dynamically determined from the optimized routing and power management parameters by adjusting the base station 110 or frequency tones associated with a particular user device 112 during the N-MaxMin WMMSE process.

Figure 4:
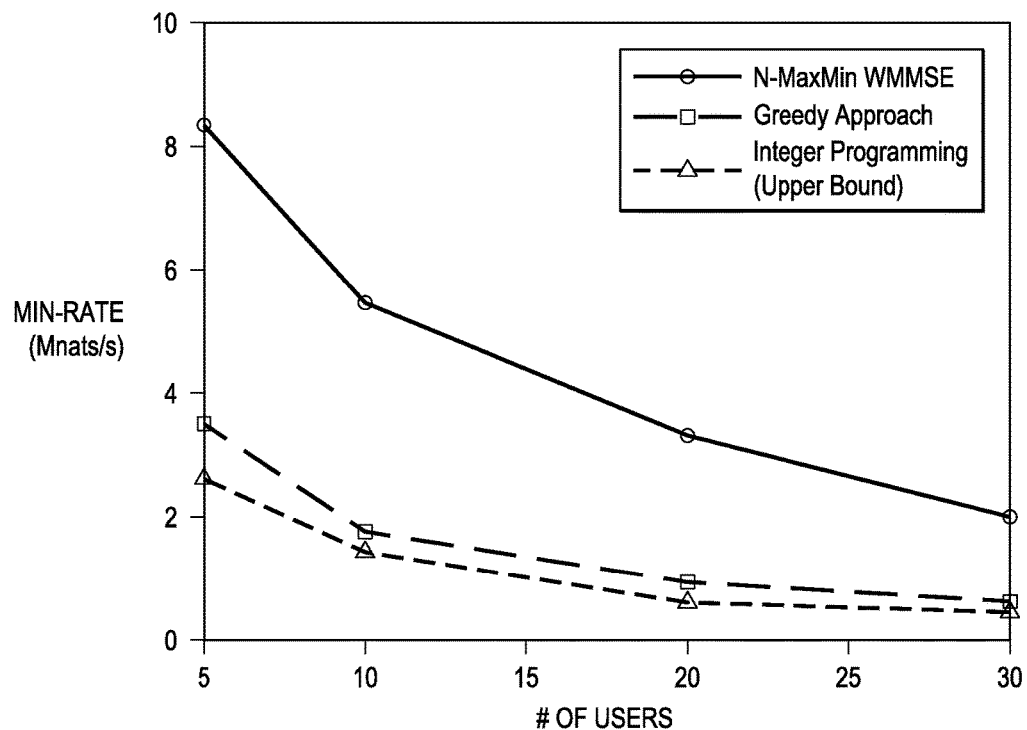
FIG. 4 illustrates min-rate of different approaches.

FIG. 4 illustrates the min-rate of different approaches. An embodiment achieves more than a 100% improvement compared to heuristics.

Figure 5:
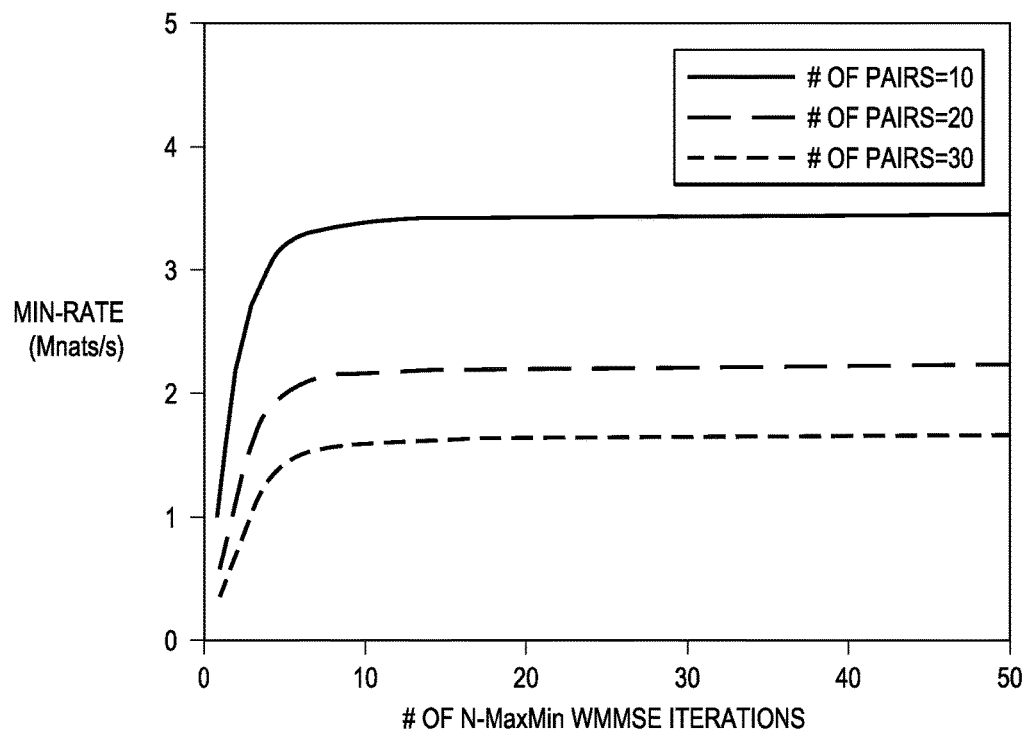
FIG. 5 illustrates min rate versus the number of N-MaxMin WMMSE iterations.
Figure 6:
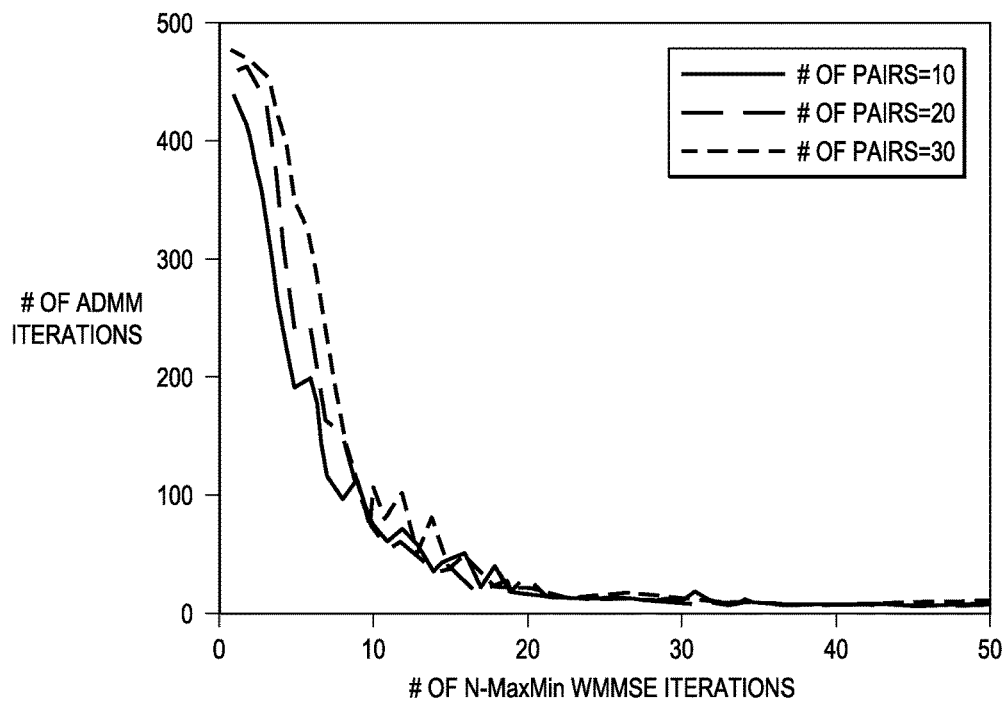
FIG. 6 illustrates the number of ADMM iterations versus the number of N-MaxMin WMMSE iterations.

FIG. 5 illustrates min rate versus the number of N-MaxMin WMMSE iterations, while FIG. 6 illustrates the number of ADMM iterations versus the number of N-MaxMin WMMSE iterations. These graphs are for a system with 57 base stations, 11 network routers, and 3 1 MHz frequency bands. The power budget for each base station is 10 dB. 10 N-MaxMin WMMSE iterations almost converge. Each N-MaxMin WMMSE iteration converges fast via ADMM.

Figure 7:
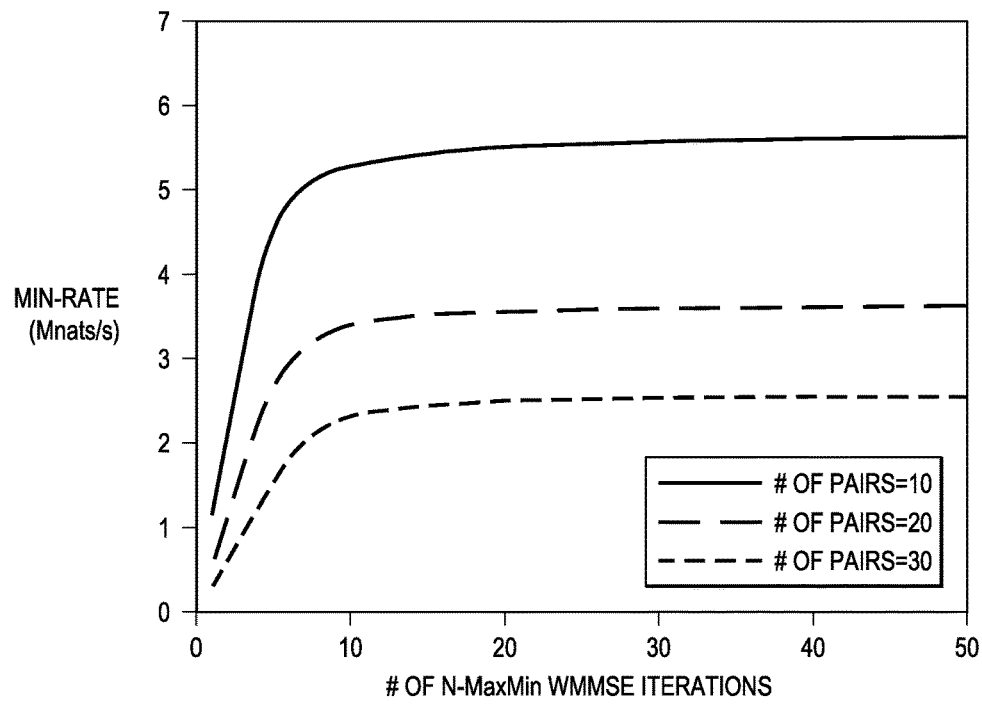
FIG. 7 illustrates min rate versus the number of N-MaxMin WMMSE iterations.
Figure 8:
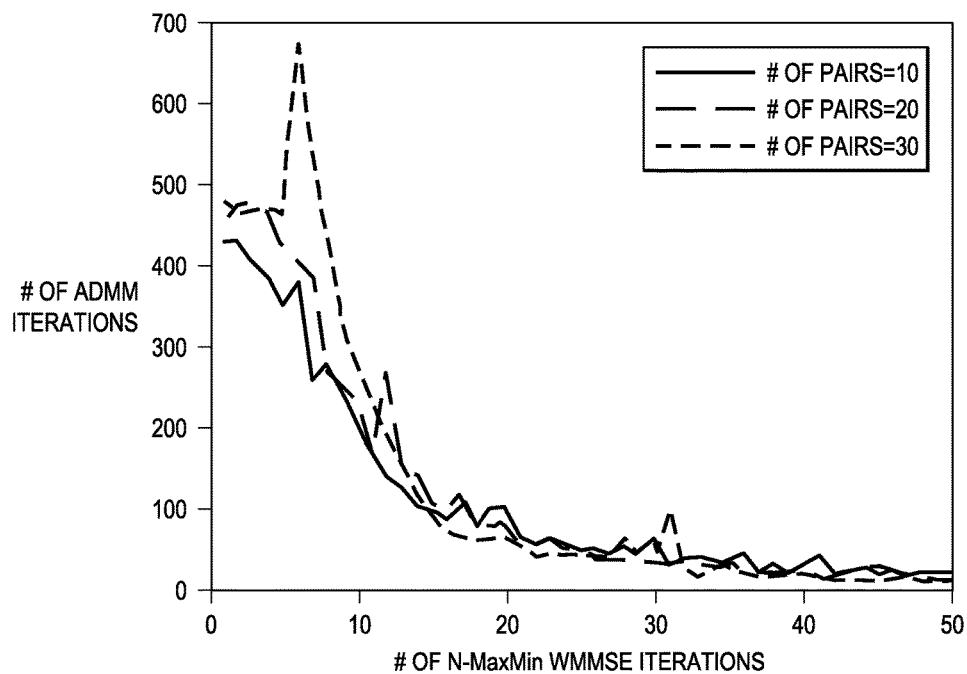
FIG. 8 illustrates the number of ADMM iterations versus the number of N-MaxMin WMMSE iterations.

FIG. 7 illustrates min rate versus the number of N-MaxMin WMMSE iterations, while FIG. 8 illustrates the number of ADMM iterations versus the number of N-MaxMin WMMSE iterations. These graphs are for a system with 57 base stations, 11 network routers, and 3 1 MHz frequency bands. The power budget for each base station is 20 dB. 20 N-MaxMin WMMSE iterations almost converge with ADMM as a fast inner procedure.

Figure 9:
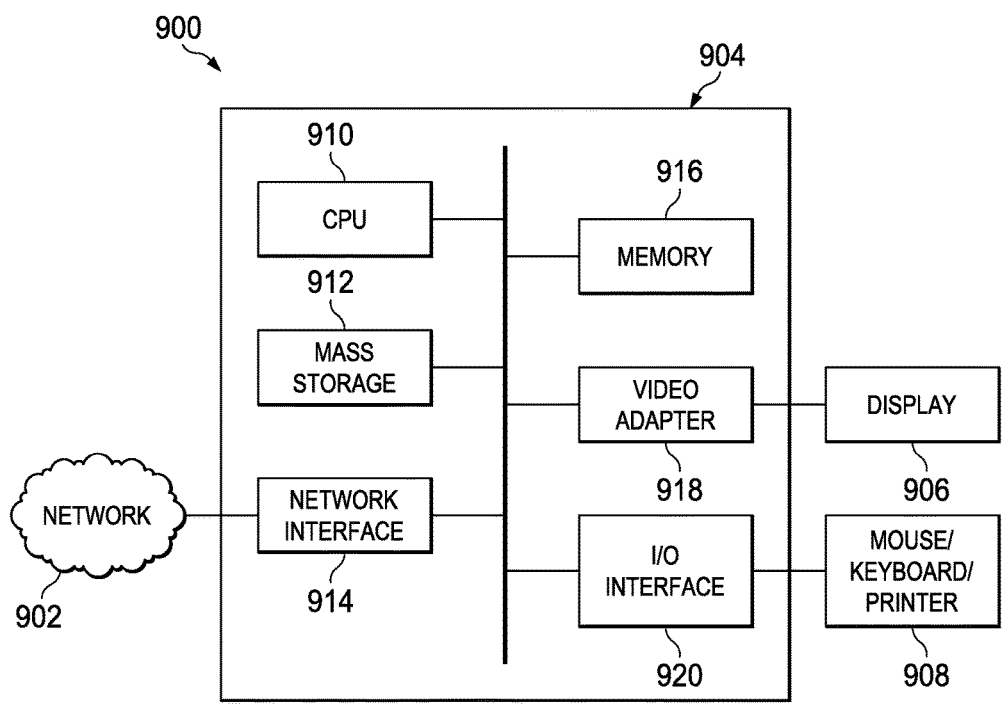
FIG. 9 illustrates a computing platform that may be used for implementing, for example, the devices and methods described herein, in accordance with an embodiment.

FIG. 9 is a block diagram of a processing system 900 that may be used for implementing the system and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 900 may be a node, base station or a controller such as a software defined network controller and may comprise a processing unit 904 equipped with one or more input/output devices, such as a speaker, microphone, mouse 908, touchscreen, keypad, keyboard, printer, display 906, and the like. The processing unit may include a central processing unit (CPU) 910, memory 916, a mass storage device 912, a video adapter 918, and an I/O interface 920 connected to a bus.

The bus may be one or more of any type of several bus architectures including a memory bus or memory controller, a peripheral bus, video bus, or the like. The CPU 910 may comprise any type of electronic data processor. The memory 916 may comprise any type of non-transitory system memory such as static random access memory (SRAM), dynamic random access memory (DRAM), synchronous DRAM (SDRAM), read-only memory (ROM), a combination thereof, or the like. In an embodiment, the memory 916 may include ROM for use at boot-up, and DRAM for program and data storage for use while executing programs.

The mass storage device 912 may comprise any type of non-transitory computer readable storage medium or device configured to store data, programs, and other information and to make the data, programs, and other information accessible via the bus. The mass storage device 912 may comprise, for example, one or more of a solid state drive, hard disk drive, a magnetic disk drive, an optical disk drive, or the like. For example, the mass storage device may be connected to the CPU 910 disposed in a node or controller and may have instructions stored thereon for communicating between nodes, communicating with nodes and/or the controller, or executing the routing and power control optimization process.

The video adapter 918 and the I/O interface 920 provide interfaces to couple external input and output devices to the processing unit. As illustrated, examples of input and output devices include the display 906 coupled to the video adapter 918 and the mouse/keyboard/printer 908 coupled to the I/O interface 920. Other devices may be coupled to the processing unit 904, and additional or fewer interface cards may be utilized. For example, a serial interface such as Universal Serial Bus (USB) (not shown) may be used to provide an interface for a printer.

The processing unit 904 also includes one or more network interfaces 914, which may comprise wired links, such as an Ethernet cable or the like, and/or wireless links to access nodes, controllers, or different networks 902. The network interface 914 allows the processing unit 904 to communicate with remote units via the networks 902. For example, the network interface 914 may provide wireless communication via one or more transmitters/transmit antennas and one or more receivers/receive antennas. In an embodiment, the processing unit 904 is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A communications system node, comprising:
a processor;
a nontransitory computer readable medium coupled to the processor and having stored thereon instructions for:
generating transmission parameter information for links having endpoints at the communications system node;
performing a portion of a flow routing and power control optimization process that comprises an alternating direction method of multipliers (ADMM) flow control process and a power management process, wherein the ADMM process and the power management process each use one or more same weighting coefficients, wherein the ADMM process dynamically generates, using the transmission parameter information and the one or more same weighting coefficients updated by the ADMM process, optimized parameters for transmissions of communication over links between the communications systems node and second communications systems nodes based on at least co-channel interferences among the links, wherein the flow routing and power control optimization process comprises power control optimization and flow routing optimization in an integrated process, and wherein the flow routing and power control optimization comprises a combined ADMM process and power management process, the optimized parameters comprising at least one optimized routing management parameter and at least one optimized power management parameter; and
transmitting the transmissions according to the optimized parameters.

2. The communications system node of claim 1, wherein the nontransitory computer readable medium further has stored thereon instructions for updating a variable in an iterative portion of the power management process.

3. The communications system node of claim 2, wherein the instructions for updating a variable in the iterative portion of the power management process comprise:
receiving an updated variable from a controller; and
performing the iterative portion of the power management process using the updated variable.

4. The communications system node of claim 1, wherein the optimized parameters comprise at least an optimized rate parameter.

5. A communications system controller, comprising:
a processor;
a nontransitory computer readable medium coupled to the processor and having stored thereon instructions for:
communicating with nodes on a communication network;
receiving transmission parameter information from the nodes for links and wireless connections having endpoints at respective ones of the nodes; and
performing joint traffic engineering and physical layer power control by performing a portion of a flow routing and power control optimization process that comprises a combined alternating direction method of multipliers (ADMM) flow control process and a power management process, wherein the ADMM process and the power management process each use one or more same weighting coefficients;

wherein the flow routing and power control optimization process generates, using the transmission parameter information and the one or more same weighting coefficients updated by the ADMM process, optimized parameters determining communications by each of the nodes based on at least co-channel interferences among links between the nodes, the optimized parameters comprising at least one optimized routing management parameter and at least one optimized power management parameter;

wherein the joint traffic engineering and physical layer power control comprises generating commands according to the optimized parameters and controlling, using the commands, one of routing of transmissions of a plurality of routers and wireless transmission provisioning of a plurality of base stations;

wherein the flow routing and power control optimization process comprises power control optimization and flow routing optimization in an integrated process; and wherein the flow routing and power control optimization comprises a combined ADMM process and power management process.

6. The communications system controller of claim 5, wherein the flow routing and power control optimization process includes using a min-max fairness utility.

7. The communications system controller of claim 5, wherein the instructions for performing joint traffic engineering and physical layer power control comprises performing a portion of the flow routing and power control optimization process with a per-user quality of service (QoS) constraint.

8. The communications system controller of claim 7, wherein the performing the portion of the flow routing and power control optimization process with a per-user quality of service (QoS) constraint comprises eliminating, from the routing and power control optimization process, links and connections that do not meet the per-user QoS constraint.

9. The communications system controller of claim 5, wherein the communications system controller is a software defined network controller that performs portions of the flow routing and power control optimization process in parallel on multiple processor cores.

10. The communications system controller of claim 5, wherein the communications system controller updates a variable in an iterative portion of the power management process using the ADMM process.

11. A method for network resource management comprising:
receiving, at a controller, first parameter information for links between nodes connected to the controller;
receiving, at the controller, second parameter information for connections between the nodes and user devices;
performing joint traffic engineering and physical layer power control on the controller and using a flow routing and power control optimization process that comprises a combined alternating direction method of multipliers (ADMM) flow control process and a power management process, wherein the ADMM process and the power management process each use one or more same weighting coefficients updated by the ADMM process, wherein the flow routing and power control optimization process comprises power control optimization and flow routing optimization in an integrated process, and wherein the flow routing and power control optimization comprises a combined ADMM process and power management process;

generating, at the controller, first and second commands according to optimization parameters determined using the first parameter information, the second parameter information, and the one or more same weighting coefficients by the flow routing and power control optimization process based on at least co-channel interferences among the links between the nodes connected to the controller, the optimization parameters comprising at least one optimization routing management parameter and at least one optimization power management parameter; and transmitting the first and second commands from the controller to the nodes connected to the controller;

wherein the first commands are for modifying transmission parameters for the links between the nodes; and wherein the second commands are for modifying transmission parameters for the connections between the nodes and the user devices.

12. The method of claim 11, wherein the first parameter information and second parameter information is received from the nodes;
wherein the first parameter information is for links having an endpoint at a respective node; and
wherein the second parameter information is for connections having an endpoint at a respective node.

13. The method of claim 11, wherein the performing the joint traffic engineering and physical layer power control includes using a min-max fairness utility.

14. The method of claim 11, wherein the performing the joint traffic engineering and physical layer power control further comprises utilizing a per-user quality of service (QoS) constraint.

15. The method of claim 14, wherein the utilizing the per-user QoS constraint comprises eliminating, from the routing and power control optimization process, the links and connections that do not meet the per-user QoS constraint.

16. The method of claim 11, wherein the controller updates a variable in an iterative portion of the power management process.

17. The method of claim 1, wherein the ADMM process dynamically generates the optimized parameters using at least two iterations, and the ADMM process dynamically updates the one or more same weighting coefficients before the ADMM process updates the optimized parameters in each of the at least two iterations.

* * * * *